3,401,172
4-METHYL-5-(β-CHLOROETHYL)OXAZOLE
Peter Elias Saeter, Fredrikstad, Norway, and Ulf Henrik Anders Lindberg, Sodertalje, Sweden, assignors to Aktiebolaget Astra, Sodertalje, Sweden, a company of Sweden
No Drawing. Continuation of application Ser. No. 324,209, Nov. 18, 1963. This application July 25, 1967, Ser. No. 655,964
2 Claims. (Cl. 260—307)

ABSTRACT OF THE DISCLOSURE

The compound 4-methyl-5-(β-chloroethyl)oxazole, and its addition salts with pharmaceutically acceptable acids, is disclosed. The compound has value as a hypnotic, sedative and anti-convulsive agent, and provides significant reduction in the incidence of hemolytic effects.

---

This is a continuation of application Ser. No. 324,209, filed Nov. 18, 1963, now abandoned.

The present invention is related to new substances having good hypnotic, sedative and anticonvulsive activity, or more exactly the invention refers to substituted oxazoles of the general formula

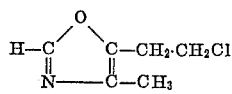

and pharmacologically active non-toxic additions salts thereof.

It is already known that addition salts of 4-methyl-5-(β-halogenoethyl)-thiazoles and aliphatic disulphonic acids possess valuable therapeutic properties and may be used inter alia for their sedative, hypnotic and anticonvulsive effect. These compounds, however, have the disadvantage that they cause haemolysis by intravenous injection and that the effective doses must be made comparatively great, which latter factor involves that the unpleasant odour and taste of the preparation becomes rather powerful. The compounds, which must often be administered in the form of injection solutions, further on exhibit very poor stability properties in solution, for which reason they have in such cases to be administered in strongly acidic solution with the accompanying risk of intravasal haemolysis.

The compounds according to the invention, which have about the same range of indication as the earlier known alkyl substituted halogenoethylthiazoles, do not exhibit the disadvantages of the last mentioned compounds, but are considerably more effective and possess such base strength and such solubility properties that they are stable in 2% solution at pH 6.

The compounds according to the invention are prepared by halogenation of a substituted 5-(β-hydroxyethyl)-oxazole according to the reaction scheme below

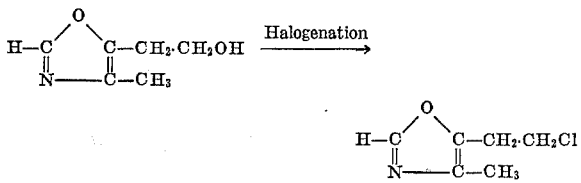

Suitable halogenating agents are thionyl chloride, phosphorus pentachloride, phosphorus trichloride, phosphorus oxychloride, hydrogen chloride, etc. The halogenation is suitably performed in an anhydrous, substantially non-polar solvent. Suitable solvents are chlorinated hydrocarbons such as chloroform, carbon tetrachloride and aromatic hydrocarbons such as benzene, toluene as well as pyridine and isopropyl ether.

Although a solvent is preferred at the carrying out of the reaction this can also occur without solvent in which case, however, a slightly lower yield may be obtained. For instance thionyl chloride may be added, preferably in portions, at the carrying out of the reaction. The reaction is suitably carried out at a temperature of from 0° C. to the boiling point of the solution, i.e. reflux temperature, during a time of about 1–24 hours.

Suitable non-toxic addition salts of the compounds according to the invention are hydrochloride, hydrosulphate, phosphate, succinate, methane-sulphonate and ethanedisulphonate. At the formation of the non-toxic addition salt the oxazole base is brought to add the acid component dissolved in a solvent having such properties that the resulting addition salt is precipitated while the two starting materials remain in solution. Suitable solvents at the formation of the addition salt are lower alcohols such as methanol, ethanol, propanol, isopropanol and butanol. In order to increase the yield another solvent of somewhat different type, for instance a ketone, such as acetone, or an ether, such as diethyl ether, may eventually be added to the alcohol solution, in which case, however, a somewhat less pure product is obtained. It is, of course, in some cases also possible to let the acid be available in crystalline form while the base itself is dissolved in a solvent of the stated type. When the addition salt has crystallized from the solution it is suitably purified by recrystallisation in, for instance, alcohol or acetone. The addition salt giving the best crystals is the ethanedisulphonate.

The 5-(β-hydroxyethyl)-substituted oxazole used as starting material may, for instance, be prepared by chlorination of acetoacetic ester with sulphuryl chloride and ring formation of the resulting α-chloroacetoacetic ester with formamide or the corresponding derivative thereof and reduction of the resulting 4-methyl-5-carbethoxy-oxazole to 4-methyl-5-hydroxymethyl-oxazole, which compound is then chlorinated with thionyl chloride and reacted with potassium cyanide, after which the resulting nitrile is hydrolyzed to the corresponding acid which is esterified and then reduced to the formation of the desired starting material.

The invention is illustrated by the following examples:

Example 1.—4-methyl-5-(β-chloroethyl)oxazole

To 5.0 g. (0.039 mole) of 4-methyl-5-(β-hydroxyethyl) oxazole dissolved in 25 ml. of anhydrous chlorofrom 5.9 g. (0.050 mole) of thionyl chloride dissolved in 10 ml. of anhydrous chloroform were added drop by drop at room temperature during about 30 minutes. The solution was then slowly heated until boiling and refluxed until the gas-evolution ceased (about 2.5 hours). After cooling 75 ml. of ice-water were added and pH was adjusted to 7–9 with 10% sodium hydroxide solution, after which the mixture was extracted 4 times with 75 ml. of chloroform. The chloroform phase was dried over sodium sulphate after which the chloroform was evaporated in vacuo and the remaining brown oil fractionated by distillation. Yield 5.0 g. of 4-methyl-5-(β-chloroethyl)oxazole (87%), boiling point 76–78° C. at 12 mm. Hg $n_D^{25}$=1.4793.

Example 2.—4-methyl-5-(β-chloroethyl)oxazole

The process according to Example 1 was repeated with the difference that anhydrous benzene was used as solvent instead of chloroform. Yield 81%.

Example 3.—4-methyl-5-(β-chloroethyl)oxazole

In a small flask 2.4 g. (0.019 mole) of 4-methyl-5-(β-hydroxyethyl)oxazole and 4.4 g. (0.021 mole) of pulverized phosphorus pentachloride were mixed. When the evaluation of heat had ceased the mixture was heated on a boiling waterbath for one hour after which the phosphorus oxychloride formed was distilled off in vacuo. After alkalinisation and treatment in the same manner as described in Example 2 1.9 g. of 4-methyl-5-(β-chloroethyl)oxazole were obtained i.e. The yield was 70%.

Example 4.—Di-[4-methyl-5-(β-chloroethyl)oxazolium] ethanedisulphonate 4.72 g. (0.0248 mole) of ethanedisulphonic acid were dissolved in 35 ml. of ethanol and added with stirring and cooling to 7.29 g. (0.0495 mole) of 4-methyl-5-(β-chloroethyl)oxazole. After a few minutes a white crystalline precipitate was obtained which was filtered off and washed with cold ethanol. Yield 10.4 g. (87%). The resulting ethanedisulphonate was recrystallized from ethanol after which the melting point was 128.5–129.9° C.

The compounds according to the invention exhibit a low toxicity. Thus, for instance, the intraperitoneal toxicity in mice of 2% solutions of di - [4 - methyl - 5 - (β-chloroethyl)oxazolium]ethanedisulphonate of pH 5.1 is $LD_{50}=340$ mg./kg. while the intravenous toxicity in mice of 1% solutions of the same compound of pH 5.4 is $LD_{50}=210$ mg./kg. The hypnotic effect (potency) determined on mice as the dose causing hypnosis in 50% of the used mice, the criterion being that the mice lost the righting reflex for at least 30 seconds, is for the same compound $HD_{50}=65$ mg./kg., i.e. it is twice as effective as the thiazole compounds mentioned above, while the duration of the hypnosis at a dose of 200 mg./kg. in mice is more than 2 hours, i.e. more than twice as long as for the thiazole compounds. When determining the motoric activity, i.e. the sedative effect after intraperitoneal injection in mice, of the said compound an $ED_{50}=55$ mg./kg. was obtained. When determining the anticonvulsive effect of the said compound in mice with spasms induced by pentylentetrazole (75 mg./kg. intraperitoneally) 50% of the mice exhibited no spasms at a dose of $ED_{50}=30$ mg./kg.

The compounds according to the invetnion may suitably be administered together with pharmaceutical indifferentiae in the form of tablets or, which is to be preferred in the treatment of severe ethanol intoxications, in the form of injection solutions. The preparation thereof is illustrated by the following examples:

Example 5.—Tablets 100 g. of di - [4-methyl-5-(β-chloroethyl)oxazolium] ethanedisulphonate was ground to a particle size corresponding to screen No. 10 (28 mesh) and moistened in a mixing apparatus with a solution of 2 g. of low-viscous ethylcellulose in ethanol. When the mixture had become homogenous it was stored for drying in circulating hot air (40° C.). After 24 hours the dry mixture was ground to such a particle size that it passed screen No. 5 (14 mesh) in a mixing apparatus with 10 g. of talcum, 4 g. of magnesium stearate and 12 g. of dried potato starch. Tablets weighing 0.64 g. were pressed from the mixture so obtained in a tabletting apparatus of standard type. Finally the tablets were sprayed with a solution of methacrylic acid plastic.

Example 6.—Isotonic injection solution

A 2% isotonic injection solution was prepared by dissolving 2 g. of di-[4-methyl-5-(β-chloroethyl)oxazolium] ethanedisulphonate and 2.5 g. of glucose in 90 ml. of water. The pH of the resulting solution was adjusted to 5.5 by adding 0.1 N sodium hydroxide solution, after which water was added to a volume of 100 ml.

What is claimed is:
1. A compound selected from the group consisting of 4 - methyl - 5 - (β - chloroethyl)oxazole and pharmaceutically acceptable addition salts thereof.
2. The compound according to claim 1, di - [4 - methyl-5-(β-chloroethyl)oxazolium]ethanedisulphonate.

References Cited
UNITED STATES PATENTS

| | | | |
|---|---|---|---|
| 2,702,803 | 2/1955 | Ainsworth | 167—52.11 |
| 2,921,076 | 1/1960 | Parcell | 167—52.1 |

OTHER REFERENCES

Burger, A.: Medicinal Chemistry, N.Y. Interscience Publishers, Inc., 1960, pp. 79–81.

Dornow et al.: Chem. Ber., 94, 1961, 1248–52.

Elderfield, R.: Heterocyclic Compounds, vol. 5, N.Y., John Wiley & Sons, Inc., 1957, pp. 324–5.

Vanevskii et al.: Chem. Abstracts, vol. 58, 13028 h. June 1963.

NICHOLAS RIZZO, *Primary Examiner.*

R. J. GALLAGHER, *Assistant Examiner.*